Oct. 13, 1931.  E. S. BRISTOL  1,827,351
CONTROL SYSTEM
Filed March 9, 1929   4 Sheets-Sheet 4
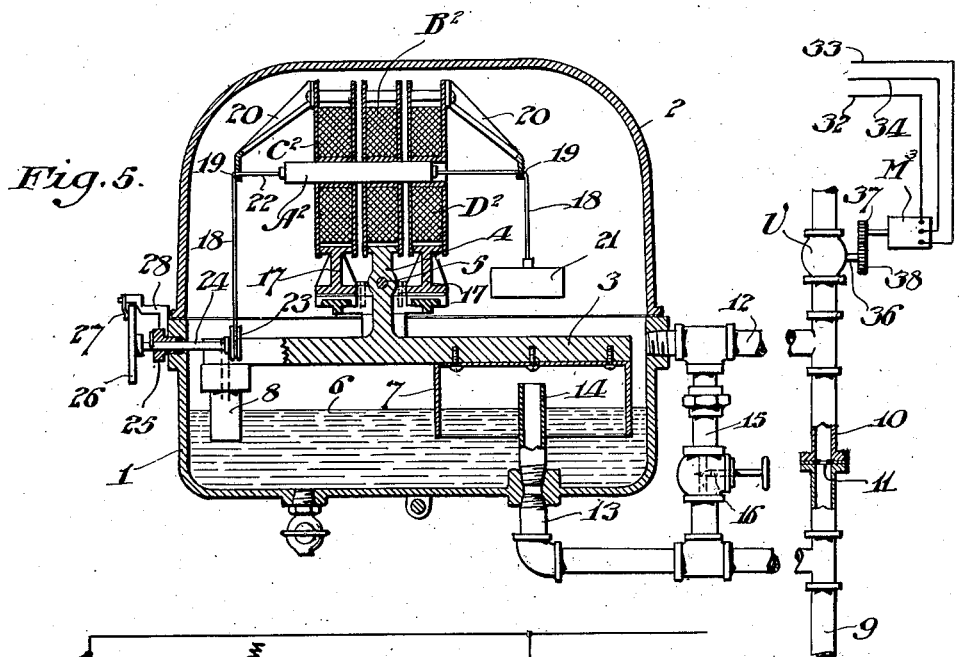

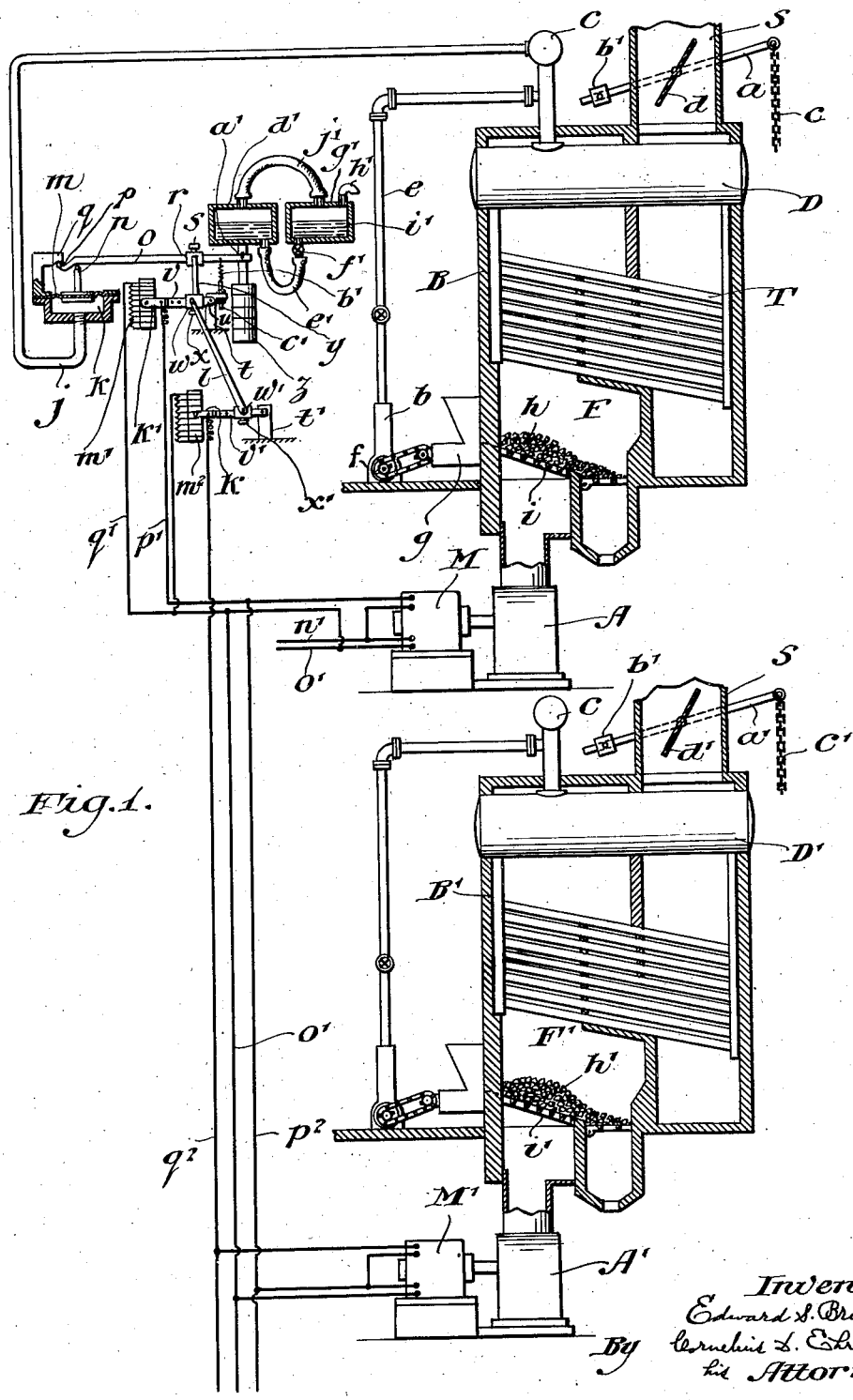

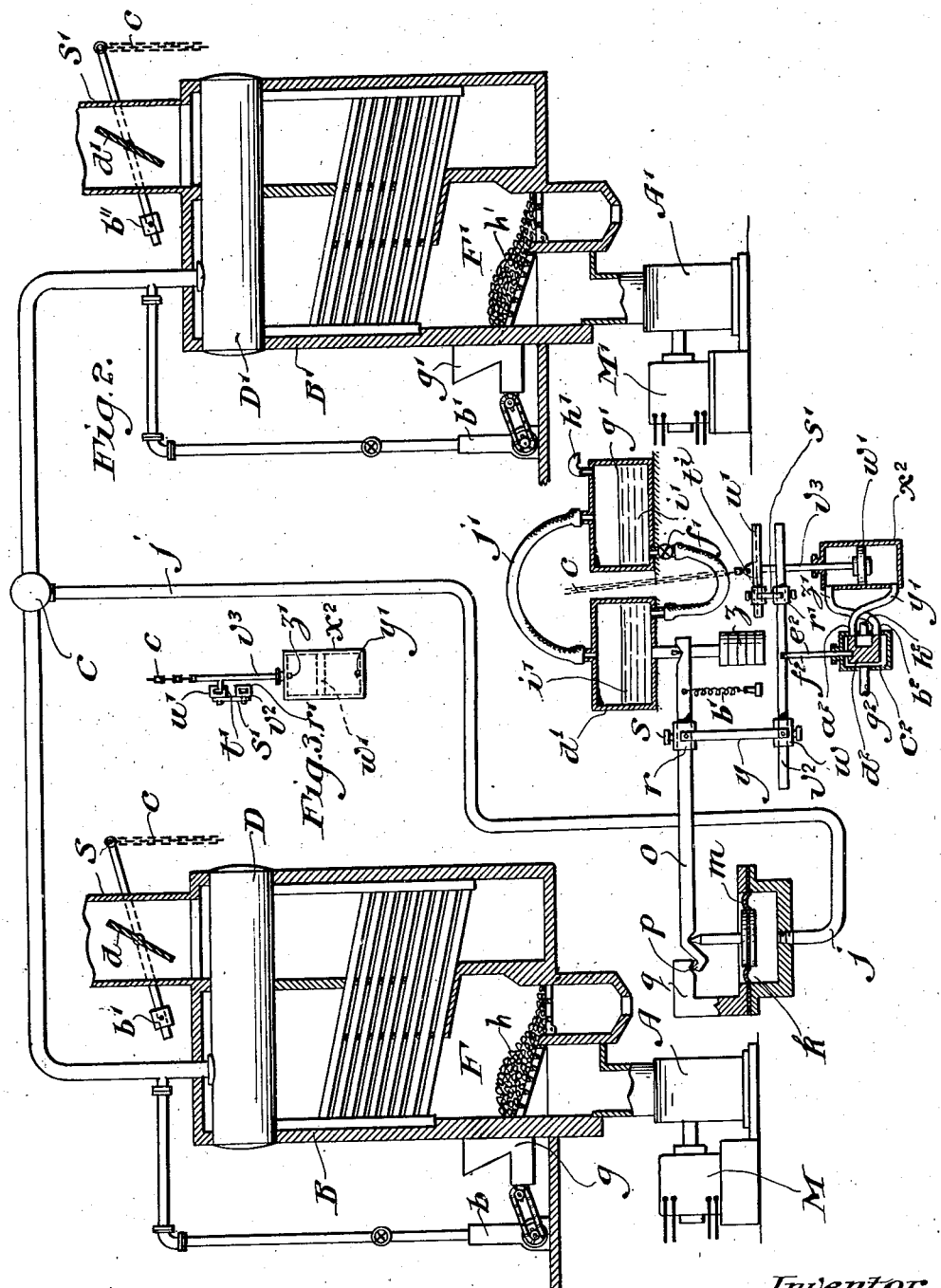

Patented Oct. 13, 1931

1,827,351

UNITED STATES PATENT OFFICE

EDWARD S. BRISTOL, OF PHILADELPHIA, PENNSYLVANIA, ASSIGNOR TO LEEDS & NORTHRUP COMPANY, OF PHILADELPHIA, PENNSYLVANIA, A CORPORATION OF PENNSYLVANIA

CONTROL SYSTEM

Application filed March 9, 1929. Serial No. 345,858.

My invention relates to a system of control or regulation of the magnitude of a quantity or condition; and more particularly relates to a system of regulation of the pressure of a fluid, and more particularly the regulation of the pressure of steam in a steam generating system.

In accordance with my invention, the application of two or more agents, or of the components of an agent, upon which the magnitude of a quantity or condition depends, is normally controlled in response to changes of the magnitude, and the normal control is modified directly in response to change in the magnitude and independently of the effect of the normal control.

In accordance with my invention, there is provided mechanism for automatically controlling two or more pressure-changing agents or factors of the same or different character in response to changes in rate of flow of a fluid, or an effect representative thereof, for example, a pressure change, in combination with means for automatically superimposing upon the automatic regulating mechanism a control independent of said agents or factors, or responsive directly to movement of a member of the control mechanism movable in response to pressure change, for the purpose of effecting change of the fluid pressure in opposite sense, to a predetermined standard, if desired, and at a suitable rate.

More particularly in accordance with my invention, there is provided mechanism for controlling automatically pressure-changing agents or components of an agent or agents, in response to pressure of, or rate of flow of, a fluid, in combination with means for superimposing automatically upon the aforesaid automatic regulating mechanism a control independent of said agents or components affecting pressure, or responsive directly to movement of a member of the control mechanism movable in response to change in pressure, or rate of flow of the fluid, for the purpose of effecting change of the fluid pressure in opposite sense, to a predetermined standard, if desired, and at suitable rate.

More particularly in accordance with my invention, the pressure control is that of steam delivered by one or more steam generators, and the control of the pressure is effected by mechanism of the character aforesaid operating to control in any suitable way the rate of combustion in the generator furnace or furnaces.

My invention resides in a system and apparatus of the character hereinafter described and claimed.

For an illustration of some of the various forms my invention may take, reference is to be had to the accompanying drawings, in which:

Fig. 1 is an illustration of an embodiment of my invention, partly diagrammatic, and partly in section and elevation.

Fig. 2 is an illustration of another embodiment of my invention, also partly diagrammatic, and partly in section and elevation.

Fig. 3 is a fragmentary side elevation of part of the structure of Fig. 2.

Fig. 5 is an elevational view, partly in section, of a control balance utilized in the system of Fig. 4.

Fig. 6 is a view, partly in elevation and partly diagrammatic, of the control circuit of the system of Fig. 5.

Figure 4:
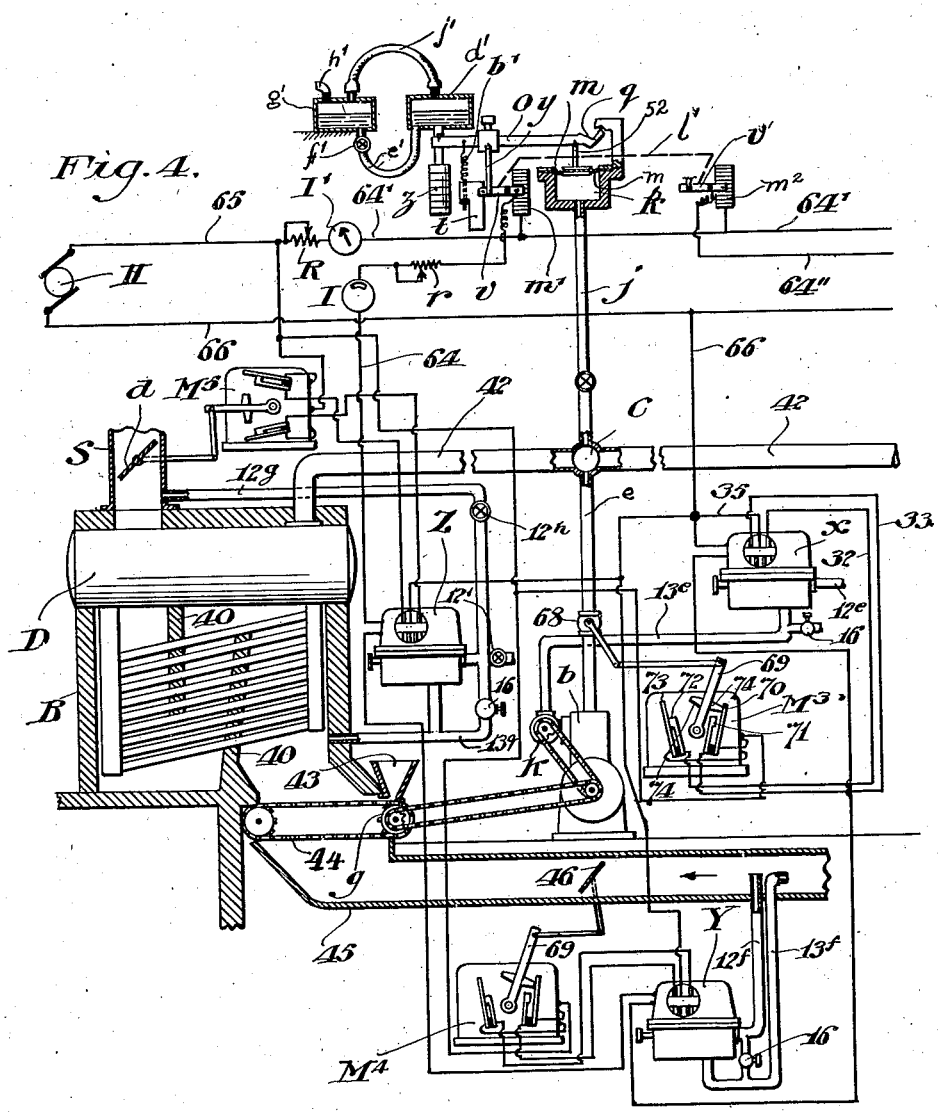
Fig. 4 is a side elevation, partly in vertical section, of a further form of apparatus utilizing my invention.

Referring to Fig. 1, B is a steam boiler or generator comprising a drum D in communication with the water tubes T, which latter are disposed in a heating chamber comprising the furnace or fire chamber F from which the hot gases pass around the tubes T and thence outwardly through the stack S provided with the damper $d$ operable by hand or automatically through the pivoted lever $a$ provided with the counterweight $b'$ and the actuating or control cord or chain $c$.

Steam is delivered through the line or conduit C to steam turbines or engines, or other steam-consuming devices. Steam is supplied through the pipe $e$ to the engine or motor $f$, which drives the stoker $g$ which delivers fuel to the fuel bed $h$ disposed upon the grate $i$, upwardly through which and the bed $h$ air is supplied at varying rate by the air blower A driven by any suitable means, as, for example, the electric motor M, which is in turn controlled in response to variations in the pressure of the steam delivered by the generator B.

Connected with the conduit C is the pipe $j$, through which the steam pressure is applied to the interior of the chamber $k$ closed by the flexible or yielding diaphragm $m$, upon which is carried the knife edge or pivot $n$, upon which rests the lever or beam $o$ provided with the pivot or knife edge $p$ engaging the under side of the abutment $q$. Movable along the lever $o$ is the member $r$, which may be secured thereto in any of its adjusted positions by the set screw $s$. Pivoted to the fixed member $t$ at $u$ is the lever $v$, along which is movable the member $w$, which may be secured in any of its adjusted positions by the set screw $x$. The link $y$ is pivoted at its opposite ends to the members $r$ and $w$, whereby movements or deflections of the lever $o$ are imparted to the lever $v$. By adjusting the members $r$ and $w$ to different positions along their respective levers $o$ and $v$, the ratio of angular movements of the levers $o$ and $v$ is variable or adjustable for the purpose of varying with respect to the pressure change effective upon the diaphragm $m$ the magnitude of the resultant control effect, as, for example, control of the speed of the motor M and therefore control of the rate of combustion in the generator B.

Opposing the pressure applied to the under side of the lever $o$ by the diaphragm $m$ is the weight $z$, hung by the knife edge $a1$ upon the lever $o$. For operating cumulatively with the weight $z$ upon the lever $o$ there may be utilized the spring $b1$, connected at its one end to the lever $o$ and at its opposite end to the member $t$, the tension of the spring being adjustable by the screw $c1$. The effect of the spring $b1$, if and when employed, is to reduce the extent of motion or deflection of the lever $o$ for a given change in steam pressure, with the result that larger pressure changes are required to produce a given magnitude of control effect.

Hung upon the lever $o$, and operating thereon cumulatively with either or both the weight $z$ and spring $b1$, is the tank or chamber $d1$ connected by the flexible tube $e1$ through the throttling valve $f1$ with the stationary or fixed chamber $g1$ having the vent $h1$ to atmosphere. In the chambers $g1$ and $d1$ is contained liquid $i1$, which may be of any suitable character, as water, oil, etc. The spaces in the chambers $d1$ and $g1$ above the liquid therein are connected through the flexible tube $j1$.

Carried by and insulated from the lever $v$ is the movable contact $k1$ of a rheostat comprising the resistance $m1$, the amount of which in circuit is increased by downward movement of the contact $k1$. The direct current shunt motor M receives its current from the supply conductors $n1$ and $o1$, across which are connected the motor armature and motor field, the adjustable resistance $m1$ being connected in series with the motor field through the conductors $p1$, $q1$, whereby the field of the motor M is weakened or strengthened as the contact $k1$ descends or ascends, effecting corresponding increase or decrease of speed of the motor M, and therefore of the blower A, and thereby increasing or decreasing the rate of combustion of fuel in the generator B.

While the weight $z$, spring $b1$ and chamber $d1$ are shown as applied directly to the lever $o$, it will be understood that any one or more of them may be applied to the lever $v$ to apply thereto a downward force to the left of its pivot $u$. And it will be understood that these members, or equivalents of them, may be similarly applied to the secondary levers corresponding with lever $v$ of any of the other arrangements hereinafter described.

The operation of a system of the character illustrated in Fig. 1 as thus far described, is as follows:

Assuming that the standard or reference pressure of the steam delivered through the conduit C shall be, for example, 250 pounds per square inch, the normal control, that is, the control effected by the lever $o$ under the control of the diaphragm $m$ and either or both the weight $z$ and spring $b1$, but without the chamber $d1$, or without change in amount of liquid therein, will, for changes of load within suitable limits, maintain the header pressure within the range of, for example, 245 to 255 pounds per square inch.

Upon occurrences of load or increase of load upon the generator B, the pressure will fall, for example, to 247 pounds. There will be a corresponding reduction in pressure in the chamber $k$, and the diaphragm $m$ will yield downwardly to corresponding extent because of the now preponderance of control upon the lever $o$ by either or both the weight $z$ and spring $b1$. In consequence, the contact $k1$ descends, cutting resistance into the field of the motor $m$, and thereby correspondingly increasing the speed of the blower A and the rate of combustion. The speed of the blower A effected by the aforesaid descent of contact $k1$ may be such as to increase the rate of combustion to such magnitude that during the persistence of the same load which caused the descent of the diaphragm $m$ the steam pressure of the generator will be maintained at the aforesaid magnitude of 247 pounds. Such normal control may effect, as stated, the maintenance of the steam pressure during persistence of load at the subnormal pressure of, say, 247 pounds, or the adjustments or proportions may be such that the rate of combustion will permit the steam pressure to further slowly or slightly decrease or slowly or slightly increase with respect to 247 pounds. When equilibrium is attained, with the speed of blower A just sufficient to maintain combustion at the rate required by the increased load, the steam pressure will become stabilized at the value necessary to hold contact k1 at a position corresponding with the increased speed of motor M.

The action of the chamber d1, however, is to vary the normal control by superimposing thereon a compounding control, effective immediately the lever o deflects. The superposed or auxiliary control is direct, in the sense that it is dependent directly upon the deflection of the lever o, and not indirectly upon any force due to or representative of a change effected through the normal control apparatus. More specifically in the example illustrated, the superposed or the compound control is effected by flow of liquid through the throttle valve f1 and tube e1 into the chamber d1, thereby applying greater weight to the lever o. This bias or force is therefore directly applied, and directly and immediately in response to deflection of the lever o, and in this instance greater as the deflection of lever o is greater; it is not due indirectly to the effect of the control, as of the blower A or any other steam-pressure-changing means, as effected in response to deflection of the lever o. When the lever arm o finally attains equilibrium after a change of load, the superposed control has acted to change the loading weight on lever o in a predetermined manner, so that the steam pressure attains a predetermined value for each position of the regulating mechanism.

Because of the increased weight applied to the lever o by the liquid passing from chamber g1 into the chamber d1, the control is compounded in the sense that notwithstanding the persistence of the load upon the generator B which caused the fall in steam pressure, the speed of the blower will be such as to effect a rate of combustion more than sufficient to maintain the steam pressure at 247 pounds, and will cause it to rise or return to 250 pounds; or the control may be overcompounded and cause a rise in the steam pressure during the persistence of the load to a value even higher than 250 pounds. The nature of the compounding action is predetermined as desired by suitably fixing the size and shape of the chambers d1 and g1.

The effect of the superposed or compounding control is, therefore, to cause an amplification or exaggeration of the normal control to effect the application of an agent, such as an agent affecting the rate of combustion in the example illustrated, or any other condition or factor upon whose magnitude depends the magnitude of the steam pressure.

The throttle valve f1 is provided to prolong or retard the flow of liquid from chamber g1 into chamber d1 upon downward deflection of the lever o or to delay or retard the flow in reverse direction from chamber d1 into chamber g1 upon upward deflection of lever o. By preference, the valve f1 is so nearly closed as to introduce a considerable time factor as regards the application of the superposed or auxiliary control to prolong the desired steam pressure change throughout a period of, for example, ten to fifteen minutes, more or less.

It will be understood that any number of steam generators may be simultaneously controlled by one and the same mechanism in response to their common steam pressure. In such case, the blower A may supply air for all of the generators of the battery or each genera or may have its own blower driven by an individual motor. For example, in the two generator installation of Fig. 1, the speed of the blower A1 driven by motor M1 is determined by the position of the contact k2 along resistance m2 connected in circuit with the field winding of motor M1 by conductors q2, p2. To effect simultaneous movement of contact arm k1 controlling the speed of blower A and of contact arm k2, the arm v' pivotally supported upon standard t' is connected to arm v, for example, by a link l, the ends of which are pivoted to slidable member w and w', respectively, the latter being adjustably secured to arm v' by a set screw x'.

The change in the rate of combustion of boiler B1 for a given change in pressure of steam in the common header C of boilers B and B1, due to change in load, for example, and the relation between the rates of combustion of the boilers is determined by positions of members r, w, and w' along levers o, v, and v' respectively. Alternatively, the resistances m1 and m2 may be designed to effect desired changed in resistance for movement from one position to another of the cooperating contact arm, equal extents of movement effecting, if desired, different resistance changes in different regions of movement.

While for purposes of illustration, I have described the control of the rate of application of air to a combustion chamber of a steam generator, it will readily be understood by those skilled in the art that the control effected by deflection of lever o may be of any other combustion factor, as rate of delivery of fuel, position of damper d, or any two or more of them, or of any other agency, in systems other than those for the generation of steam, whose magnitude, rate of application of agent, or position may determine or affect the pressure to be regulated. In the arrangement of Fig. 2, the control mechanism there disclosed may be used in a system such as indicated in Fig. 1, or in a system of any other character above referred to for controlling the magnitude, rate of application, or position of a control agent.

Referring to Figs. 2 and 3, there is illustrated an arrangement in which along the secondary lever $v2$ is adjustable the member $r1$, to which there is pivoted the link $s1$ pivoted at its upper end to the member $t1$ adjustable along the member $u1$ carried upon the piston rod $v3$, upon which is secured the piston $w1$ movable in the cylinder $x2$. To the rod $v3$ is connected also the chain $c$, utilizable for varying the position of the damper $d$ to thereby vary the rate of combustion of the generator B, as when natural draft is used, or as when forced draft is supplied so as to maintain a desired pressure beneath the fuel bed $h$, as will be understood by one familiar with the art. The lower and upper ends of the cylinder $x2$ are connected through the passages $y1$ and $z1$, respectively, with the upper and lower ports $a2$ and $b2$ of the pilot valve structure comprising the chamber $c2$, in which is movable with respect to the ports $a2$ and $b2$ the slide valve $d2$ operated by the rod $e2$ pivoted to the lever $v2$ at $f2$. Fluid under pressure, as steam, air, water, etc., is delivered through the pipe $g2$, and directed according to the position of the valve $d2$ into the cylinder $x2$ on one side or the other of piston $w2$, the fluid being exhausted through the exhaust or discharge outlet $h2$.

By the adjustment of the members $r1$ and $t1$ along the lever $v2$ and member $u1$, respectively, the distance between the pivot $f2$ and the pivotal mounting of the lever $v$ upon the member $t1$ through the link $s1$ is varied to procure any suitable ratio of movement of the slide valve $d2$, whose movement is further affected by the ratio of movements of the levers $o$ and $v2$ as determined by the positions of the members $r$ and $w$ upon the levers $o$ and $v2$, respectively.

In general, the operation is similar to that described in connection with Fig. 1, in that the flow of liquid from chamber $g1$ into chamber $d1$ upon downward deflection of the lever $o$ effects a superposed or amplified control causing the piston $w2$ to move in such a direction and to such extent as to move the damper $d$ in such direction and to such extent as to effect a rate of combustion which may be such either as to maintain the pressure corresponding with the increased load, or as to cause such pressure to rise and return to or beyond the standard or reference pressure.

The damper $d'$ in the stack S1 of steam generator or boiler B1 may be operated simultaneously with damper $d$ and moved to equal or different extent as desired. Obviously any number of dampers may be simultaneously controlled by movement of plunger $w2$. The relative positions of dampers $d$, $d'$, etc. for any load upon the group of boilers may be determined, for example, by changing the length of respective chains $c$.

As before stated, movement of arm $o$ may additionally be utilized to change the position of one or more rheostat contacts controlling the speed of blower A and/or blower A1.

The piston $w2$ by its motion reacts through the lever $v2$ upon the valve $d2$ to return it to or toward its port-closing position. In the example illustrated, a downward deflection of the lever $o$ causes upward movement of the piston $w2$ and of chain $c$, and reacts upon the valve $d2$ to return it upwardly toward or to port-closing position.

With structure of this type there is a definite position of the piston $w2$ corresponding to any position of the arm $o$ within the working range. The use of the piston $w2$ and its adjuncts of the character described may, as indicated, be utilized in lieu of or in addition to the motor M and its control of Fig. 1.

Referring to Fig. 5, a receptacle 1 with the member 2 forms a sealed or pressure-tight chamber within which is disposed the arm or beam 3 having the upstanding arm 4 secured upon a shaft 5 carrying at its opposite ends knife edges resting upon fixed abutments, whereby the members 3 and 4 are delicately and nicely pivoted for movement about an axis which, in the example illustrated, is horizontal.

Disposed in the vessel 1 is a body of any suitable liquid, as oil, rising to a suitable level, for example, that indicated at 6.

Attached to the beam 3 is a bell or openended chamber 7, whose mouth or open end is disposed below the level 6 of the liquid. Secured to the beam 3 is the member 8, projecting into the liquid, and compensating for changes in height of liquid level 6. Adjustment of normal position of beam 3 may be effected by a weight (not shown) adjustable longitudinally of the beam.

Through a pipe 9 flows a fluid, such as air, gas, etc., in response to changes in whose rate of flow there is exerted upon the beam 3 a varying force. This force, in the example illustrated, is a differential pressure, the resultant of the difference in pressures on opposite sides of the plate 10 having the orifice 11, within the pipe 9. From one side of the orifice 11 connection is made through the pipe 12 to the interior of the chamber above the liquid level 6; and from the other side of the orifice 11 connection is made hrough the pipe 13 and the pipe 14 to the interior of the bell 7 above the liquid level 6, the pipe 14 preferably being separate from the pipe 13 and threaded to the receptacle 1, as indicated in Fig. 5.

The difference between the pressures inside and outside of the bell 7, as effected by the connections 12 and 13, may be adjusted or varied, for a given rate of flow of fluid through the pipe 9, by recourse to the bleeder pipe 15 connecting the pipes 12 and 13 and controlled by any suitable throttling means, as a needle valve 16.

Secured upon the upper end of the arm 4 is a magnet coil B2, disposed between the stationary coils C2 and D2 carried upon the stationary supports 17, suitably carried and supported within the chamber.

Common to two or more of the coils is the iron or other core A2, having attached to one end thereof a cord 18, or equivalent, passing through the eye 19 in a bracket 20, and having attached to its other end the weight 21.

Attached to the other end of the core A2 is a cord 22, or equivalent, passing through an eye 19 in a second bracket 20. The cord 22 is wrapped around and has its end secured to the spool or drum 23 secured upon the rotatable shaft 24, extending through the pressure tight stuffing box or gland 25 to the exterior of the chamber, where there is secured thereon the disc or wheel 26, which may be suitably marked or indexed with graduations, with which co-acts the combined index or pointer and disc-clamping member 27 carried by the bracket 28 secured to the chamber.

As diagrammatically indicated in Fig. 6, there is carried by the movable arm 4 a contact 29z co-acting with the laterally adjustable stationary contacts 30z and 31z. The fixed and movable contacts are utilized for controlling any suitable electric circuit for effecting any desired or suitable result, as a control.

As illustrated in Fig. 6, stationary contacts are connected by conductors 32 and 33, respectively, with the external terminals of two series field windings of a reversible electric motor M3, the other terminals of the series field windings being connected to the same terminal of the armature of the motor, whose other terminal connects by conductor 34 to one terminal of a source of current, whose other terminal connects by conductor 35 with the movable contact 29z. The contacts 29z, 30z, 31z may control relays which in turn control the motor M3.

The translating device or motor M3 may be utilized to effect any suitable or desirable operation or control. In the example illustrated, the motor M3 rotates the stem 36 of a valve V which controls the rate of flow of fluid through the pipe 9. As generically indicated by the pinion 37 and gear 38, there is provided between the armature shaft of the motor M3 and the driven member, as valve stem 36, reduction gearing, whereby the motor armature may make several or many revolutions for one revolution of the stem 36, for effecting nicety of control and for introducing a time lag of suitable magnitude, if desired.

When the rate of flow of fluid through the pipe 9 is too great, the difference between the pressures within and without the bell 7 is of a magnitude sufficient to overcome the magnetic force exerted by the coil B2 upon the stationary coil or coils C2, D2, all of which are connected in series with each other and are traversed by a control current, with the result that the arm 4 is tilted to close the circuit from the current source through one of the field windings and the armature of the motor M3, causing rotation of the valve stem 36 in such direction as to reduce the rate of flow which, upon attaining the desired magnitude, causes such a force to be exerted upon the beam 3 that the contact 29z resumes its mid or neutral position indicated in Fig. 6, opening the circuit of the motor M3. Similarly, when the rate of flow falls below the desired magnitude, the beam 3 is tilted in the opposite direction, closing the circuit through the other series field winding and armature of the motor M3, causing the armature to rotate in opposite direction from that of the preceding case, and rotating the stem 36 to open the valve V, and the resultant increase of rate of flow causes the force exerted by the differential pressure upon the beam 3 to increase and overcome the force exerted by the control coils until the contact 29z again resumes its mid or neutral position when the circuit of the motor M3 is opened.

To vary or adjust the magnitude of the magnetic force as exerted between the fixed and movable coils, for a given magnitude of the control current flowing therethrough, and thereby vary the relation between the magnitude of control current and the differential pressure exerted upon the beam 3 for a given magnitude of flow of fluid through the pipe 9, the disc 26 is turned in suitable direction to effect movement of the core A2 to the right or the left, with the result that for a given magnitude of current through the fixed and movable coils the amount of force exerted between them is adjusted or varied to suitable magnitude. Accordingly, by varying the position of the core A2 there is varied the effect of a control current of a predetermined magnitude upon the range or amount of control effected by the circuit controlled by the fixed and movable contacts.

Or without changing the position of the core A2, a change in the opening of the needle valve 16 changes the force exerted upon the beam 3 in response to a predetermined rate of flow of fluid through the pipe 9.

It will be understood that either the core A2 alone may be shifted in position, or the valve 16 alone may be adjusted, or both may be adjusted to affect the relation between the rate of flow of fluid and the magnitude of the control current. Variation of position of the core A2 varies the constant of the instrument or the relation between the magnitude of the electric current and the force effected thereby by means of the fixed and movable coils. Variation of the position of the valve 16 varies the relation between the force exerted upon the movable structure, as the beam 3, and the rate of flow of fluid, by varying the difference in pressures effectively applied to the control balance.

By the utilization of a movable coil B2, with one or more fixed coils, C2, D2, the force exerted as between the movable coil and the fixed coil or coils is proportional to the square of the magnitude of the current traversing the coils, and the force exerted upon the balance arm or beam 3 is proportional to the square of the rate of flow of fluid through the pipe 9, and accordingly the rate of flow of fluid is proportional to the magnitude of the control current.

Reference is had to Fig. 4, illustrating a group of controls for a boiler or steam generator for effecting maintenance of substantially predetermined standard steam pressure notwithstanding wide fluctuations in load upon a plant.

The steam generator may be of any suitable type, and in the example illustrated, comprises water tubes, associated with suitable baffle walls 40 for directing the hot gases in a circuitous path, and communicating with the drum D, from which steam is discharged to header C. Fuel is delivered into the chute or hopper 43 on to the travelling grate or stoker structure $g$, air being delivered through the duct 45, as from a blower, under control of the damper 46, to the under side of the grate and through the fuel bed thereon for supporting combustion, the hot gases passing upwardly around the water tubes, downwardly between the walls 40 and upwardly to the breeching, stack or chimney S controlled by the damper $d$.

The pressure of the steam in header C is communicated through the pipe $j$ to the chamber $k$, one of whose walls is a flexible diaphragm $m$ acting through the post 52 upon the lever $o$ fulcrumed upon the knife edge $q$ and having the attached biasing weight $z$. Attached to the lever $o$ at a desired point is an elastic member, preferably a helical spring $b1$.

A link member $y$ transmits movement of lever $o$ to contact arm $v$ pivoted to fixed support $t$ and coacting with resistance $m1$ to vary, in response to changes of steam pressure operative upon the underside of diaphragm $m$, the magnitude of the control current supplied by a substantially preferably constant potential source, as generator H, to the control circuit comprising the conductor 64 connected through the manually adjustable resistance $r$ and resistance $m1$ to the feeder conductor 64', thence through the manually adjustable, master control resistance R and conductor 65, to one terminal of generator H whose other terminal is connected to line conductor 66.

The pressure within chamber $k$ is dependent upon at least three different factors; i. e., boiler pressure, pressure drop between the boiler and point of attachment of pipe $j$, and velocity head of steam flowing through pipe 42, the last two factors being definite functions of rate of flow of steam through pipe 42. Since the velocity head is ordinarily a negligible factor with the pipe $j$ connected to 42 adjacent a boiler drum D, the pressure within chamber $k$ closely approximates that of the boiler whereas, with pipe $j$ connected to steam main or header C at a point between which and the boiler there exists considerable pipe line resistance, the pressure within chamber $k$ is very largely, or to a considerable extent, affected by changes in pressure drop through the discharge pipe 42. In the latter case with the pipe line resistance commonly encountered in boiler plant practice, the pressure drop due to rate of flow is the controlling or dominant factor so that pressure changes in boiler plant header are closely related to variation in steam flow.

At X, Y and Z are indicated control balances of any suitable character, and preferably of the character illustrated in Fig. 5. As indicated in Fig. 6, the control circuit includes in series with each other the fixed and movable control coils B3, C3, D3 of the auxiliary controller or control balance X, the fixed and movable control coils B4, C4, D4 of the auxiliary controller or control balance Y, the fixed and movable coils B2, C2, and D2 of auxiliary controller Z, and, when suitable or desirable, the ammeter, recording ammeter or integrating current meter I. The control coils are similar to the control coils B2, C2 and D2, as described in connection with Fig. 5, included in circuit therewith and in each of the auxiliary controller or control balances is provided in association with the control coils the movable cores A2, A3 and A4, adjustable as and for the purpose described in connection with Fig. 5.

The stoker or means for delivering fuel to the furnace of the steam generator is driven by any suitable motor, as, for example, the steam engine $b$, supplied with steam from any suitable source, for example, the pipe 42 or header C, through the pipe $e$ controlled by the valve 68, in turn controlled by a reversible electric motor M3, preferably through suitable reduction gearing, not shown, which drives the oscillatory lever 69, connected through suitable elements to the movable member of the valve 68. The movable contact $29x$ of the control balance X is connected with the conductor 66, while the stationary contacts $30x$ and $31x$ connect to the series field windings of the motor M3, whose armature connects with the conductor 65. A movable contact 70 and a fixed contact 71 constitute a limit switch in the field circuit controlled by contact $30x$; and similar contacts 72, 73 constitute a limit switch in the field circuit controlled by contact 31x. The lever 69 carries the members 74, which are adapted to engage the movable contacts 70 and 73 at the limits of travel in opposite directions to break the motor circuit.

The engine b drives an air blower K which effects, through pipe 13e, corresponding with pipe 13 of Fig. 5, within the bell on the balance arm of the controller X a pressure dependent upon the speed of the stoker g. The space above the liquid in the controller X communicates with the atmosphere through the pipe 12e, whereby there is effected a differential pressure acting upon the tilting balance arm, the effective pressure being adjustable, if suitable or desirable, as by connecting the pipe 13e to atmosphere through a needle valve, such, for example, as 16 of Fig. 5.

The damper 46 in the air-supplying duct 45 is actuated by the reversible motor M4 which, preferably through reduction gearing, not shown, moves the lever 69, operatively connected to the damper 46, in opposite directions, the lever 69 controlling the limit switches, as described in connection with the motor M3. The movable contact 29y, of the control balance Y, connects with the conductor 66, while the stationary contacts 30y and 31y connect with the series field windings of the motor M4.

The tube 12f extends into the air duct 45 and connects with the chamber of the control balance Y, and the pipe 13f communicates with the interior of the bell of the balance Y and terminates within the duct 45 at an extension facing the direction of the air current, whereby the differential pressure representing the rate of flow of air is exerted upon the balance arm of the controller Y, the operation of the damper 46 being in general similar to the operation of the valve 68, the damper 46 being brought to such position that the effect of the control current is balanced by the effect of the differential pressure, and when there is an unbalance, the motor M4 rotates in such direction to move the damper 46 in such direction as to restore a balance. A needle valve 16, or equivalent, may form a bleeder connection between the tubes 12f and 13f, as explained in connection with Fig. 5.

The damper d in the breeching, stack or chimney S is similarly actuated by the reversible motor M5, provided with limit switches and controlled by the control balance Z, whose movable contact 29z connects with the conductor 66 and whose stationary contacts 30z and 31z connect with the series field windings of the motor M5.

The pipe 12g communicates with the breeching or stack S, and the pipe 13g communicates with the fire box above the fuel bed. As the magnitude of the control current through the fixed and movable coils of the controller Z varies, the damper d will be correspondingly varied in position to effect such differential pressure as between the fire box and stack to effect a rebalancing of the controller Z. The pipes 12g and 13g may be connected by a bleeder pipe, controlled by a needle valve 16 or the like, as explained in connection with Fig. 5. Furthermore, the pipe 12g, in lieu of connecting with the stack S, may open to atmosphere, as by closing valve 12h and opening valve 12i to atmosphere; and in this latter case the control is effected according to difference between overfire and atmospheric pressure; the bleeder effect may be attained by simply bleeding the pipe 13g directly to atmosphere through a needle valve or the like.

The operation of the system indicated in Fig. 4 is as follows:

The pressure of the steam delivered through the pipe 42 from the boiler is permitted to fall temporarily through a suitably small range, as of the order of twenty pounds per square inch, with increase of load from minimum to maximum, the magnitude of the control current changing inversely with and in definite relation to the change of steam pressure.

Accordingly, as the steam pressure falls with increase of load, the magnitude of the control current increases by a corresponding predetermined amount, with the result that, for a given position of the core A3 of the control coils of the control balance X, the force exerted by the control current upon the balance mechanism increases, throwing the movable system of the balance X out of balance, causing energization of the motor M3, which rotates in such direction as to actuate the valve 68 in such direction as to further open it and allow delivery of more steam to the engine b, which increases in speed, increasing the rate of delivery of coal or other fuel from the hopper 43 into the fire chamber, the controller Y simultaneously causing energization of the motor M4 to actuate the damper 46 in the air duct 45 in such direction as to cause or allow delivery of air to the fuel or fire box at a correspondingly increased rate, the effect of increase of supply of fuel and air effecting a greater rate of combustion and a greater rate of steam production. With increased speed of the engine and greater rate of flow of air through the duct 45, the differential pressures exerted in the controllers X and Y increase until balance is restored and the motors M3 and M4 deenergized.

The increase in magnitude of the control current through the fixed and movable coils of the controller Z unbalances it, causing energization of the motor M5, which rotates in such direction as to move the damper d further toward open position until the increased differential pressure ultimately balances the force exerted by the control coils, in which case the motor M5 is deenergized with the damper $d$ wider open and in a position suited to the increased rate of combustion.

In accordance with my invention, as thus far described, therefor, the magnitude of change of the control current is definitely related to the magnitude of change of steam pressure, the current increasing with decrease of steam pressure, and vice versa. The mechanism which effects a change in magnitude of the control current to accord with change in steam pressure may be considered a master controller which effects a control of the auxiliary controllers X, Y and Z, as described.

It is generally desirable that the pressure in the header C be maintained substantially constant. The provision of chambers $g1$ and $d1$ connected by tubes $e1$ and $j1$ effects, as above described in connection with the arrangements of Figs. 1 and 2, restoration of the pressure to a standard value irrespective of the position of contact arms $v$ and $v'$, simultaneously movable by any suitable connection indicated generically by the dash line $l'$. The adjustment of valve $f'$ effects adjustment of the rate of pressure-restoration action.

The rate of delivery of fuel as controlled by the auxiliary controller X is proportional to the magnitude of the control current, the differential pressure in the controller X being proportional to the square of the speed of the blower K, and therefore of the speed of the engine $b$ and of the stoker mechanism, and the force exerted by the control current is proportional to the square of the current, whereby the speed of the engine $b$ and the rate of delivery of fuel by the stoker is proportional to the control current.

Similarly, as regards the controller Y, the differential pressure exerted thereon is proportional to the square of the rate of flow of air through the duct 45, and the electric control force is proportional to the square of the control current, whereby the controller Y functions to maintain a rate of delivery of air which is proportional to the control current.

When pipe $12g$ communicates with stack or breeching S and pipe $13g$ communicates with the furnace, controller Z is responsive to a pressure differential that is substantially proportional to the square of the rate of flow of gases through the heat exchange structure of the boiler and the force exerted by the control current is proportional to the square of that current, whereby the controller Z functions to effect such position of the damper $d$ that the rate of flow of gases through the heat exchange structure is proportional to the control current.

It is generally desirable to maintain a pressure below atmospheric in the furnace above the fuel bed. Such a condition can be definitely secured by leaving pipe $12g$ open to the atmosphere so that controller Z will operate directly to maintain a furnace suction. The pressure differential acting on the balance will then be proportional to the square of the rate of overfire air supply, whether the latter be by infiltration through the furnace walls or by definitely provided openings. As the force exerted by the control current is proportional to the square of that current, controller Z will function so to set damper $d$ that the rate of over-fire air supply is proportional to the control current. Such action is desirable to secure efficient secondary combustion. To secure a slight furnace suction even at no load, a weight can be permanently placed upon arm 3 of controller Z, so that a slight pressure differential will be required to balance the controller when the control current is reduced to zero.

As above described, the master controller establishes, in response to steam pressure variations, predetermined magnitudes of the control current which through the auxiliary controllers effect rates of delivery of fuel and air, and rates of discharge of gases through the stack S, proportional to the control current, which latter is varied in direct proportion, but inversely, with changes in steam pressure. Accordingly, upon a decrease of steam pressure, the rate of supply of fuel and air and discharge of gases through the stack S is increased in like proportion to the decrease in steam pressure; and vice versa, with an increase of steam pressure, the auxiliary controllers effect proportionate decreases in rate of delivery of fuel and air and discharge of gases through the stack S.

Furthermore, the ratio between magnitude of control current and the rate of flow or delivery of fuel, the rate of flow of air through the duct 45, and the rate of flow of gases to or through the stack S, may be altered or changed in magnitude by adjustment, as by discs 26, Fig. 5, to effect adjustment of the cores of the balance coils in any one or more auxiliary controllers, or by effecting an equivalent change in the relation to the actual magnitude of the force produced by the electric current to the magnitude of the current; or by the bleeder action which varies the actual magnitude of the differential pressure exerted upon any or all of the controllers; or both the bleeder action and the matter of adjustment of force exerted by the current may be resorted to.

As shown in Fig. 4, the pipe $j$ may be tapped to a header or discharge pipe C to which two or more boiler units as above described are connected, each unit having respective auxiliary controllers X, Y and Z subject to the common master controller whereby the boiler system is controlled as a unit. The ammeter I1 indicates the total control current, that is, the sum of the control currents of the boiler unit branch circuits, and is representative, under stated conditions, of the system demand or load. The setting of the manually adjustable resistance R common to the several control circuits determines the largest value of control current that may flow, and this determines one limit of control. By short-circuiting the resistances m1 and m2, control of the boiler system may be effected by manual variation of resistance R, the operator setting the movable contact to a suitable or desirable point corresponding with information afforded by pressure gauges or other devices.

Desired distribution of total system load between the several units may be effected manually by adjustment of their individual control current limiting resistances r, the respective ammeters I indicating the value of control current in each control circuit and under stated conditions, the load carried by the unit. Short-circuiting m1, m2, etc. and R, permits complete manual control of each individual control circuit by variable resistance r.

The overfire pressure, that is, the pressure in the region over the fuel bed upon the grate 44, or with which the pipe 13g communicates, is increased either by moving the stack damper d toward closed position or by increasing the underfire air blast pressure. The overfire suction is due to the difference between the pressure in the overfire region and atmospheric pressure, and accordingly, since atmospheric pressure is substantially constant, the overfire suction increases with decrease in overfire pressure.

In accordance with one aspect of my invention, the combustion is controlled so as to increase the overfire suction with change of the steam pressure from a predetermined magnitude. This control is obtainable by the auxiliary controller Z, as by effecting movement of the stack damper d toward open position in response to decrease in the steam pressure, thereby reducing the overfire pressure and accordingly increasing the overfire suction.

It is to be understood that the term "overfire" pressure is not restricted to the pressure over a fuel bed or grate but includes the pressure in any furnace chamber, as for example, in a furnace to which liquid, gaseous, or pulverized solid fuel is supplied and in which there is no fuel bed.

For brevity in the appended claims, by the term "directly" as applied to the response of the auxiliary control to changes in pressure, or other condition of operation, it is meant that the auxiliary control is not dependent upon a change, for example, in the rate of combustion resulting from the primary control action but responds to the same change which effects the primary control.

This application is a continuation in part of my co-pending application Serial No. 756,856, filed December 18, 1924.

What I claim is:

1. In the art of controlling the pressure of vapor of a vapor generator, the method which comprises closely following a change in pressure of the vapor by a primary control which substantially immediately changes the rate of vapor generation in accordance with the pressure change, superposing an auxiliary control of the rate of vapor generation directly in response to said change in pressure, and effecting application of said auxiliary control at a rate substantially slower than said primary control.

2. The combination with a vapor-generator, of control mechanism closely following changes in vapor pressure, means controlled by said mechanism for changing the rate of generation of vapor by said generator substantially immediately to an extent determined by the changes in pressure, and means directly responsive to operation of said control mechanism for superposing an auxiliary control upon said controlled means, to effect further change in the rate of vapor generation in the same direction and at a slower rate of change.

3. In a control system for vapor generators, control mechanism comprising a controller for changing the rate of vapor generation, a movable member, means for moving said member to affect said controller and closely following changes in magnitude of an operating condition substantially immediately to change the rate of vapor generation to an extent determined by the change of said condition, and means directly responsive to movement of said movable member for applying weight thereto at a rate slower than the rate of movement of said member by said first means.

4. In a control system for vapor generators, control mechanism comprising a movable member for varying the rate of vapor generation, means closely following changes in magnitude of an operating condition for moving said member substantially immediately to change the rate of vapor generation to an extent determined by the change of said condition, means directly responsive to movement of said member for applying weight to said movable member and comprising a movable chamber, means for delivering liquid to said chamber in amount dependent upon the position of said chamber, and means for retarding the flow of said liquid.

5. The combination with a vapor generator and means for controlling the rate of vapor generation thereby, said control means closely following changes in magnitude of an operating condition substantially immediately to change the rate of vapor generation to an extent determined by the change of said condition, of means directly responsive to said changes for applying a supplemental control of the rate of vapor generation at a slower rate.

6. The combination with a vapor generator and means for controlling the rate of vapor generation thereby, said control means closely following changes in vapor demand substantially immediately to change the rate of vapor generation to an extent determined by the change in vapor demand, of means operable upon controlling action of said control means in either sense to effect further change in the rate of vapor generation and at a slower rate of change.

7. In the art of controlling the operation of a vapor generator, the method which comprises effecting, as a primary control, changes in the rate of generation of vapor by the generator which closely follow changes in an operating condition, and superposing an auxiliary control of the rate of vapor generation directly in response to said changes of said operating condition, and at a rate substantially lower than the primary control.

8. In the art of controlling the operation of a vapor generator, the method which comprises effecting change in the rate of vapor generation which closely follows change in an operating condition and whose extent is dependent upon said change in said operating condition, and effecting, directly in response to the change in the operating condition, further change in the rate of vapor generation in the same sense and at a slower rate of change.

9. The combination with a vapor generator, of means for controlling the rate of vapor generation by said generator, means closely following changes in the vapor pressure for actuating said control means to effect substantially immediate change in the rate of vapor generation to extent determined by the change in pressure, and means directly responsive to operation of control means actuating said control means to effect further change of the rate of vapor generation in the same direction and at a slower rate of change.

10. A control system comprising means for controlling the rate of vapor generation including a movable element, means closely following changes in flow and including movable structure controlling said first means for changing the rate of vapor generation substantially immediately to extent determined by the change in flow, and means for applying to said movable structure a force, varying with change in position of said movable element but at a slower rate, to effect a supplementary control of the rate of vapor generation.

11. A control system for a vapor generator comprising means for controlling the rate of vapor generation including responsive means closely following changes in vapor pressure substantially immediately to change the rate of vapor generation to an extent determined by the change in pressure, and means directly responsive to said pressure changes slowly changing the rate of vapor generation to restore said pressure to a predetermined standard within a time interval determined by the extent of said pressure change.

EDWARD S. BRISTOL.